(12) United States Patent
Bush

(10) Patent No.: US 8,176,636 B2
(45) Date of Patent: May 15, 2012

(54) HIGH PRESSURE, HYDRAULIC HAND TOOL FOR CUTTING HOOVES ON HORSES OR OTHER APPLICATIONS

(76) Inventor: William L. Bush, Wentzville, MO (US)

( * ) Notice: Subject to any disclaimer, the term of this patent is extended or adjusted under 35 U.S.C. 154(b) by 466 days.

(21) Appl. No.: 12/381,786

(22) Filed: Mar. 17, 2009

(65) Prior Publication Data

US 2010/0236079 A1 Sep. 23, 2010

(51) Int. Cl.
*B26B 17/00* (2006.01)
(52) U.S. Cl. .................... 30/180; 30/92; 30/187
(58) Field of Classification Search ........... 30/92, 180, 30/187, 228
See application file for complete search history.

(56) References Cited

U.S. PATENT DOCUMENTS

| | | | | |
|---|---|---|---|---|
| 492,931 A * | 3/1893 | Baird | | 30/180 |
| 728,068 A * | 5/1903 | Young | | 30/228 |
| 1,440,264 A * | 12/1922 | Arn | | 30/180 |
| 2,330,009 A * | 9/1943 | Romanoff | | 30/189 |
| 2,366,909 A * | 1/1945 | Johnson | | 30/228 |
| 3,039,189 A * | 6/1962 | McBerty | | 30/245 |
| 3,255,525 A * | 6/1966 | Frenzel | | 30/180 |
| 3,706,245 A * | 12/1972 | Van Schaik | | 81/301 |
| 3,893,237 A * | 7/1975 | Jahnke | | 30/228 |
| 4,506,445 A * | 3/1985 | Esten | | 30/228 |
| 4,521,963 A * | 6/1985 | Lind et al. | | 30/92 |
| 4,663,847 A | 5/1987 | Van Horn | | |
| 5,083,971 A * | 1/1992 | Karubian et al. | | 452/64 |
| 5,134,776 A * | 8/1992 | Moody | | 30/187 |
| 5,243,761 A * | 9/1993 | Sullivan et al. | | 30/134 |
| 5,875,554 A * | 3/1999 | Vogelsanger | | 30/228 |
| 6,684,679 B2 * | 2/2004 | Hsieh | | 72/453.15 |
| 7,107,812 B1 * | 9/2006 | Patton et al. | | 72/392 |

* cited by examiner

*Primary Examiner* — Hwei C Payer
(74) *Attorney, Agent, or Firm* — Paul M. Denk

(57) ABSTRACT

A structurally integrated high pressure, hydraulic hand-held tool for cutting the hooves on horses. The tool includes a handle, with a hydraulic flow line provided centrally therethrough, a chamber integrated into the upper end of the handle, the chamber comprising a piston, so that as hydraulic fluid is exerted into the handle chamber, it forces the piston upwardly and out of the handle chamber, and at the upper end of the tool are a pair of mounts, that pivotally connect a pair of opposing jaws, each jaw having a cutting blade, and including links and a clevis that pivotally move the jaws and their cutting blades into a cutting action upon the horse hooves.

11 Claims, 5 Drawing Sheets

HIGH PRESSURE, HYDRAULIC HAND TOOL FOR CUTTING HOOVES ON HORSES OR OTHER APPLICATIONS

CROSS REFERENCE TO RELATED APPLICATION

This non provisional patent application claims priority to the provisional patent application having Ser. No. 61/072,332, filed on Mar. 28, 2008.

FIELD OF INVENTION

This tool is structurally designed to incorporate high pressure, as a hydraulic actuated hand tool, for furnishing significant cutting action for cutting and or trimming applications, such as trimming branches, for use in the butcher shop for cutting bone, for trimming animal hooves, industrial or heavy cables, sheets of tin or heavier metals, and the like, and for numerous other cutting needs.

BACKGROUND OF THE INVENTION

Various styles of cutters have long been available in the art. For example, certain styles of cutting tools that are operated only by hand have been designed specifically for cutting the hooves of horses or for other heavy duty cutting applications. The manually or hand operated cutter has long been known, and used in the equestrian arts for cutting hooves, aiding in the removal of nails, and for other applications related to purposes adaptable to farriers. Generally, such early cutters simply incorporated the pliers structure approach, where a pair of cams lead towards and terminate at cutting edges, and which are affixed into a pivotal relationship, like the common pliers, having lengthy extending handles that provide leverage for the cutting operation, and the ability to exert force necessary to cut through dense structure, like the hoof of a horse, when conducting the trimming act.

Of more recent vintage, is a hoof type trimmer device that is hydraulically actuated, so that significant pressure may be applied to the cutters, when nipping the hoof of a horse, or for trimming the same. Such prior art is shown in the Van Horn, U.S. Pat. No. 4,663,847, which discloses a hydraulic means that actuates a pair of C-shaped cutting blades, not unlike that which was embodied in the earlier manual type of cutter, as a forceps, and utilized a variety of lever arms to pull the cutting blades back into cutting proximity, for nipping of the hoof, during its usage. The working parts of the '847 device and other prior art devices are entirely exposed to the elements, and subject to corrosion and the like, and the moving parts of the prior art devices are manifestly unsafe when used by the operator, allowing clothing, fingers, hair, and other undesirable matter to be exposed to the moving parts of the device. Furthermore, it is unclear how such prior art devices can readily be used or manipulated by the operator of such devices as no handle or means for gripping or holding the device is shown or characterized. The pulling action of the piston in the '847 device results in a twisting of the blades, preventing the formation of a cutting edge at the point at which the blades are intended to be juxtaposed. The art failed to take advantage of such devices and still there is a long felt but unsolved need for improvements in this art area. Masters in the farrier arts continue to use manually operated c-shaped plier type cutting tools to effect their trade, requiring an unusually large amount of force when used, placing themselves into arduous, awkward, and risky positions given the nature of the animals that are being manipulated.

The current invention provides improvements upon the aspects of a cutting apparatus, by furnishing a fully encased, high pressure, hydraulic hand tool that incorporates structure that is substantially more rigorous and adaptable in its assembly within the tool, provides a tool that is more broadly applicable and adaptable to different heavy duty cutting needs, and with reference to the ease of use for the operator, provides substantially greater cutting precision, is easier to use, easier to handle and to grip, is lighter than tools in the prior art dedicated to the same or substantially the same cutting purposes, in certain embodiments and configurations is substantially safer than prior art tools, and can exert significantly more pressure than prior art tools when the tool is operated for a particular cutting action.

SUMMARY OF THE INVENTION

This invention provides the structural formation of a reinforced style of hydraulic cutter, that operates under high pressure, within the range of from or around 3,000 pounds per square inch (psi) to about 6,000 psi (plus or minus about ten to fifteen percent of these pressure parameters), with respect to hydraulic fluid compressed within the chamber(s) of the instrument, and is designed to provide more accuracy in specifically cutting through dense materials, such as cables, metal sheeting, tree limbs, animal hooves such as the hoof of a horse, and so forth, with more significant strength translated through the cutting edges of its jaws, and which has a variety of other uses for application of its cutting blades as for the cutting of limbs, and the like. This tool is a high pressure, hydraulic hand tool which can be adapted for any particular cutting operation, and which can be readily accommodated because its cutting blades are interchangeable and replaceable.

A significant amount of force is required to cut through dense materials, such as the hoof of a horse, especially if the hoof material has become very dry, since in the absence of moisture, the keratin molecules of the hoof materials are more closely packed together and are less susceptible to the crushing and cutting force which may ordinarily be capable of being applied by manually operated hand tools designed for the cutting application. The tool of the present invention, when used for trimming of animal hooves, can save the farrier (horse shoer) a significant amount of time, and virtually eliminate the strenuous labor necessary for manipulating the limbs of the horse, during the hoof processing activities.

The tool of the present invention, as summarized herein, includes a handle composed of metal, such as aluminum, tungsten, hardened plated steel, stainless steel, or reinforced ceramic or plastic material, and which may be covered with a rubber or other type of polymer, or have an etched, engraved or molded and polished or brushed metal surface, or even a wood overlay application, to add friction and comfort for enhancing the grip and hold of the tool by the operator. The handle means extends along the longitudinal axis of the tool, and includes a central cavity that accommodates a piston, which is designed to operate the jaws of the tool, when hydraulic fluid or compressed gas pressure is actuated or applied to the piston. The handle means has an end that is distal from the jaws, and an end that is proximal or nearer to the jaws. Certain other components of the tool are also aligned along the longitudinal axis of the tool, including the central cavity and the piston, both of which therefore also exhibit a jaw distal end and a jaw proximal end. The portion of the cavity in the jaw proximal end of the handle means incorporates a piston (which has a jaw distal end and a jaw proximal end, and the jaw proximal end is also referred to herein as the rod or the rod-end of the piston), that shifts within the jaw proximal end of the cavity or chamber, and one or more o-ring or other sealing means cooperates with the piston so as to allow the pressure of the fluid or gas to act upon the jaw distal end of the piston, forcing the piston through (or further) into its chamber and towards the jaw proximal end of the tool, when the tool is activated for closure of its jaws, during a cutting procedure. There is an optional seal means provided at the jaw proximal end of the cavity, and through which the rod-end of the piston extends, but which likewise is also sealed by an o-ring, or other means, (1) to assist in guiding the rod-end of the piston along the longitudinal axis of the tool while the piston is in motion, and (2) because the metal composition of the piston and rod-end of the piston are optionally dissimilar to the composition of the housing cap which is threadily seated into the jaw proximal end of the handle and over the jaw proximal end of the cavity, to provide an insulative and lubricative seal at that position. A portion of the jaw proximal end of the piston is sheathed or surrounded by a coil spring having an inside diameter that is slightly larger than the outside diameter of the piston at that position, and when pressure is applied to the blade or jaw distal end of the piston, forcing the piston through the cavity and toward the jaw end of the device, the movement of the piston in that direction compresses the spring. The jaw proximal end of the piston rod, which may also be referred to as the extension of the piston rod, pivotally connects with interchangeable link arms that act as a clevis, and the clevis, when shifted towards the blade or jaw end of the tool, as a result of movement of the connected piston in that direction, forces the upper jaws of the tool into closure, and a cutting action. Each link arm has a jaw proximal and a jaw distal end. The jaw proximal end of a link arm is pivotally connected to the elbow of a jaw. Each link arm is also pivotally connected at its jaw proximal end to the elbow of an L shaped jaw, one end of the jaw being described as the blade proximal end or blade mounting end or simply the blade end, and the other end of the jaw being described as the blade distal or alternatively the piston proximal end. The blade distal end of each jaw also forms a fulcrum and is alternatively referred to as the fulcrum point. Pressure applied to the jaw distal end of the piston forces the piston up through the chamber and toward the blade proximal end of the chamber, forcing the piston proximal end of each link arm toward the blade end of the device. Two substantially 'L' shaped jaws, which are identical and thus interchangeable, are presented for the purpose of (1) providing a base upon which the identical and interchangeable blades are attached at the blade proximal end of each jaw, and (2) providing a fulcrum point or a center fulcrum point for opening and closing the space between the cutting edge of each blade, bringing the cutting edge of each blade together precisely so that a cutting action is achieved. The elbow of the L shape of each jaw is pivotally connected and mounted to the jaw proximal end of one of the identical and interchangeable link arms, the other jaw being pivotally connected and mounted to the other link arm. Each L shaped jaw comprises a cutting mount at the end of the L-shape that is distal from the point at which each jaw is connected to the link arm. The mount functions as a base to which a cutting blade is positioned or fastened. The center of the fulcrum point at the blade distal end of each jaw is held at a permanent position with reference to the handle of the tool or device. Movement of the piston upwardly (toward the blade end of the device), forces the jaws into closure, thereby furnishing a cutting edge between the pair of aligned cutter blades, during usage. Then, as the hydraulic pressure is released from the piston, the spring causes the piston to retract back into the cavity towards the blade or jaw distal end of the handle, resulting in an immediate opening of the jaws, which thus releases the material that was cut by the pressure applied to the cutting edge between the pair of aligned cutter blades, and back into the starting position. The pivotally connected elbow of each L shaped jaw is positioned in such a way as to prevent vertical or horizontal movement of the jaw from the fulcrum point pivotal position, and the action of the piston on the blade distal end of each jaw results in a hinge-action at the elbow position of each L shaped jaw.

The housing or cavity has two ends oriented along the long axis of the tool. The upper end (the jaw proximal end of the cavity) of the housing holds the jaws in position, and in the diagram shown in FIGS. 5, 6, and 7, is designed for allowing the clevis to shift approximately from about four tenths of an inch (0.40") to about five tenths of an inch (0.50"), towards the jaws, and thereby pushes the cutter blades into closure. This variation thus depends on the size of the device and the purpose for which the device is intended to be used.

Each jaw consists of two pieces, generally fabricated of hardened steel, that come together from the force applied to the clevis when its connected piston is subjected to the hydraulic pressure. The jaws are identical in shape and size, and thus are interchangeable. Attached to each jaw is a replaceable blade, that may vary in width from about one (1) inch to about two (2) inches, or more, depending on the size of the device and the type of cutting use for which the device is intended. A blade attached to a first jaw is interchangeable with a blade attached to a second jaw in the device of the present invention. Depending on the particular cutting application, different size blades, i.e., blade pairs that exhibit a wider or narrower width across the cutting edge formed when the blade edges are in adjacent proximity to each other at the cutting position can be considered, such as for use in a butcher shop, as for cutting bones, for use in cutting tree limbs and other dense plant materials, for use in electrical applications such as for cutting large diameter wire or cable, for use in cutting leather or other heavy fabric materials, for use in military applications for cutting steel bars, for use by stone masons for stone cutting applications, or for numerous other heavy force cutting needs. The blades are designed to be easily manipulated on their mounts, and fine adjustments can be made by the operator of the device to achieve a finely adjusted desired scissors effect. One blade cutting edge can be slightly higher than the other blade cutting edge, thus achieving the scissors effect instead of a pinching or crushing type of cutting effect.

The hydraulic power source can be an air over hydraulic booster, and can exhibit at least about a 50:1 ratio—and from about 3,000 to about 6,000 psi of hydraulic pressure which is delivered or guided to flow through an appropriately sized hose, attached to the tool handle, with a hydraulic booster providing the needed force to allow for usage of this tool, when applied as a cutting means. In the present example, the hydraulic booster incorporated into the structure of this tool is made by Enerpac, Inc., of Lancaster, Pa.

The pump unit that is applied to power the hydraulic power source is of the usually type of pump that is applied for that purpose, and which can operate either from direct current, or alternating current, in its operations. The pump is designed to provide the significant increase in the hydraulic fluid pressure, to the cutting tool, to ensure that is has sufficient power to operate for its intended purposes, as summarized herein.

The hydraulic booster supplies the pressure to the jaws, simply through the push of a button, that closes the jaws, and holds the blades in place for a cutting action, and in the preferred usage, can easily sever the intended cutting target, for example a piece of the hoof of a horse, requiring less time and physical activity with respect to the operator handling the tool, to achieve the desired cutting effect.

It is, therefore, the principal object of this invention to provide a high pressure, hydraulic hand tool that has a minimum of operative parts, but yet which can exert significant pressure and force for application of its cutting blades for cutting dense objects and/or materials.

Another object of this invention is to provide a hydraulic cutting tool with blades that can be quickly and efficiently replaced or exchanged with blades of a different type or dimension during the process of activities related to the desired cutting operation, depending upon the type of cutting action required. The blades can also be reused, and/or resharpened to exact tolerances for continued use when remounted to the jaws of the device of the present invention.

Still another object of this invention is to provide a hydraulic cutting tool that can be used for cutting the hooves of a horse or other animal exhibiting extremely dense hoof material such as a cow, deer, goat or other ruminant, bone, branch or tree trimming, wire, cable, leather or nylon or other heavy fabric, sheet metal or tin or other metals of various shapes and sizes, ceramics, tiles and masonry materials, and numerous other cutting needs.

Yet another object of this invention is to provide a hydraulic cutting tool that with its hydraulic booster, can obtain fluid pressures within the range of from about 3,000 psi to about 6,000 psi, plus or minus, anywhere from about 500 psi to about 900 psi above and/or below this pressure range.

Still another object of this invention is to provide a very stable and sturdy structural hand tool that can precisely apply significant force for cutting very dense objects or materials, applying the necessary significant force with great precision to achieve the desired cutting effect upon the dense object or material, such as the hooves of a horse, during usage.

These and other objects may become more apparent to those skilled in the art upon review of the summary of the invention as provided herein, and upon undertaking a study of the description of its preferred embodiment, in view of the drawings.

BRIEF DESCRIPTIONS OF THE DRAWINGS

DESCRIPTION OF THE PREFERRED EMBODIMENT

Figure 1:
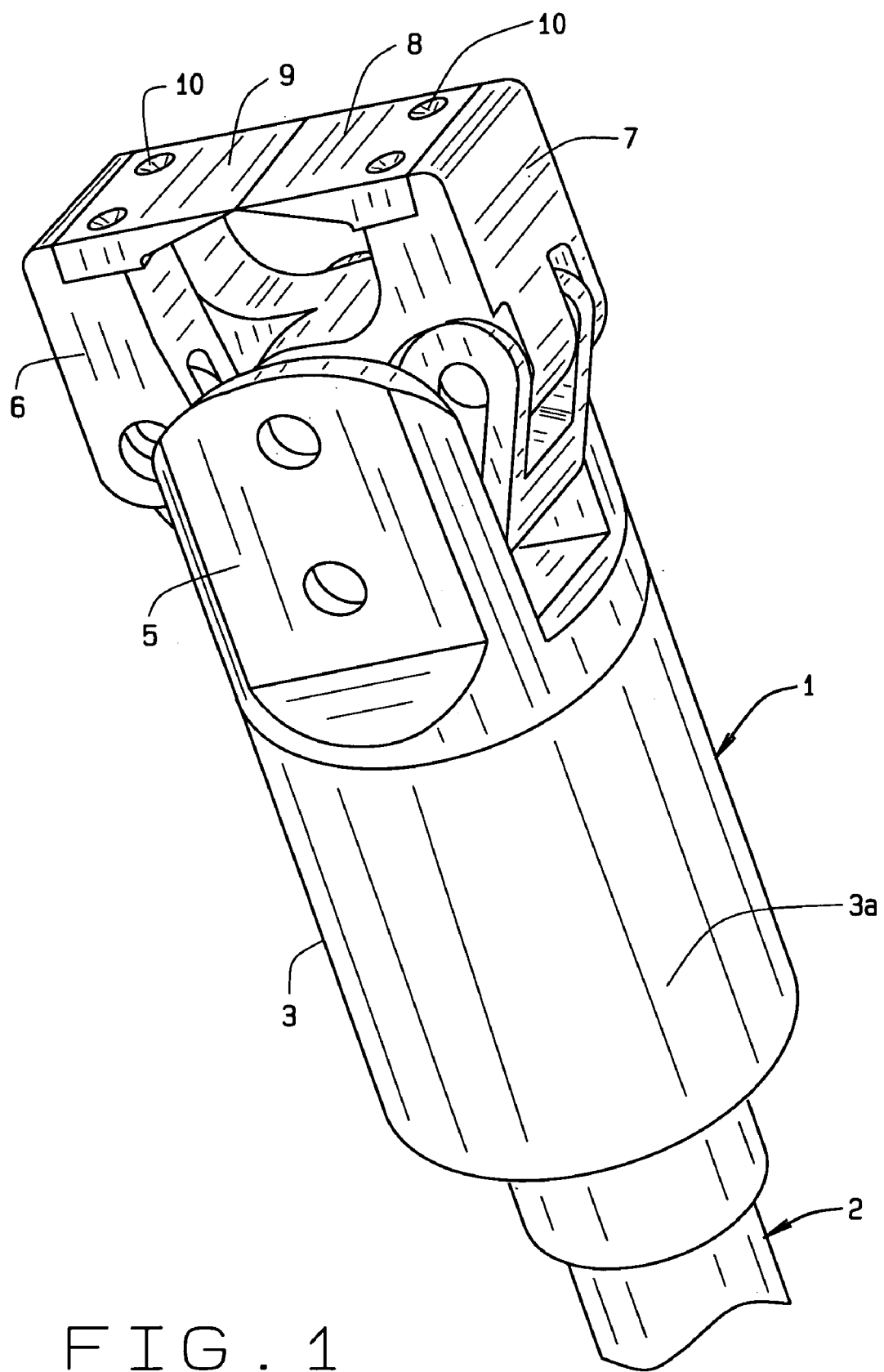
FIG. 1 is an isometric view of the upper end or cutting segment of the high pressure, hydraulic hand tool for cutting purposes.
Figure 2:
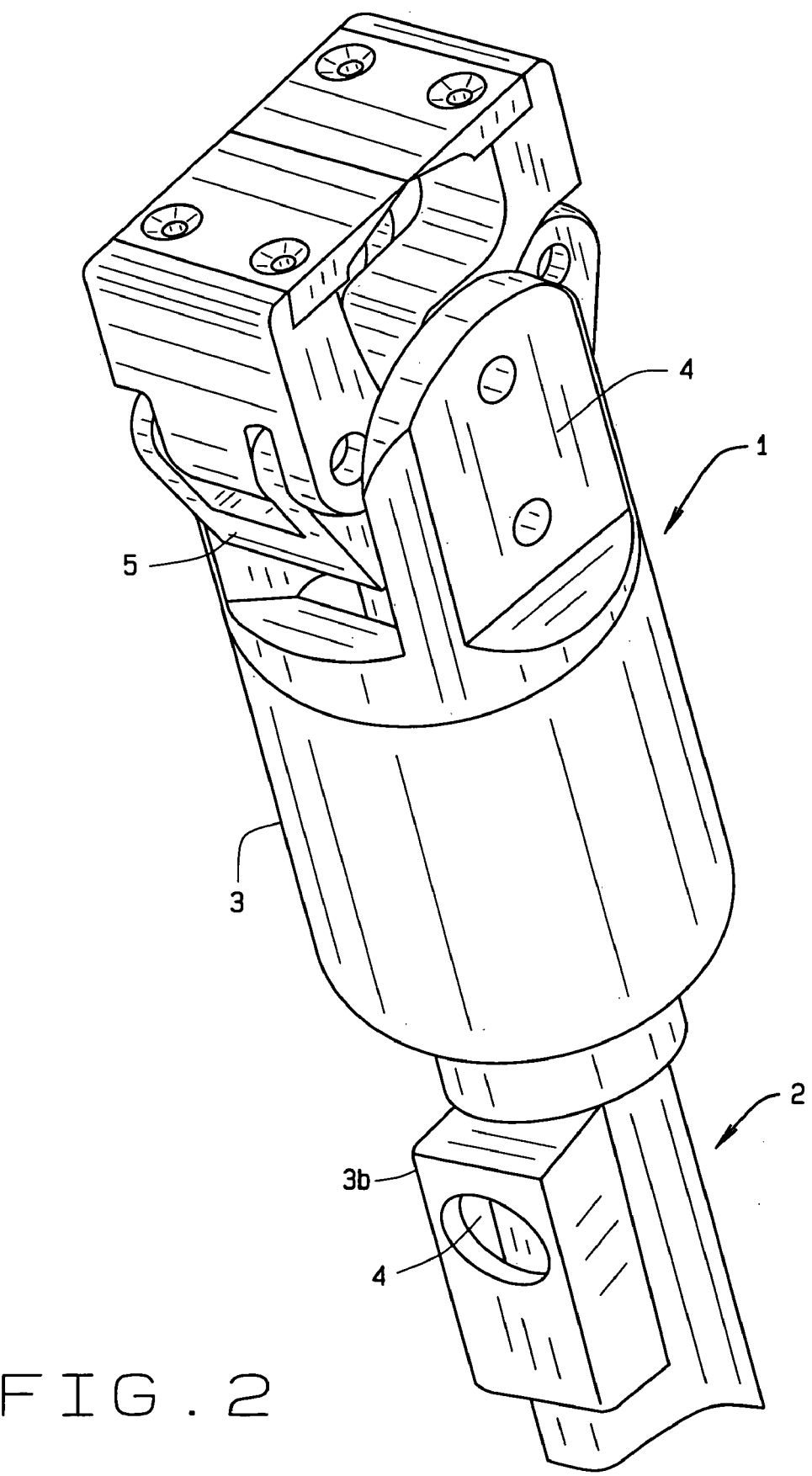
FIG. 2 is another isometric view, from a different angle, of the upper end of the tool.

In referring to the drawings, and in particular FIGS. 1 and 2, therein is shown the upper half of the cutting tool 1 of this invention, which includes the upper end of the handle 2, which discloses the operative components, as at 3, incorporating a push button 4, which can be initiated when desired to operate the cutting tool, through a cutting cycle. The various electrical components that are provided for initiating the compression of the hydraulic fluid, into a high pressure condition, and which controls the hydraulic booster (not shown), at the hydraulic pump, are all operated from this single control.

As previously stated, the handle, in order to reduce the weight of the tool, may be made of aluminum, or perhaps of other metal, in order to provide the endurance during usage for the tool when applied. The handle may even be covered with an insulation means such as a rubber or other polymer coating such as vinyl, as at 3a, providing a non-slip or abrasive or friction bearing surface for the operator to hold, grip, or grasp the tool firmly and comfortably during usage. Also it insulates the user's hand from initializing the dead man switch or safety switch of the tool.

Applied to the upper end of the handle is a housing 3 which is integrally formed having a pair of upwardly extending mounts 4 and 5, and which mounts are provided for securing with, at least for pivotal purposes, segments of the cutter jaws, as will be subsequently described.

The jaws 6 and 7 are secured atop the housing, as can be noted, and each jaw has a cutting blade 8 and 9 threadily engaged to its respective jaw, by the means of threaded fasteners, as at 10, or the like. In both drawings, of FIGS. 1 and 2, the cutting tool is shown in its closed or cutting condition, with the front edges of the blades 8 and 9 being in close proximity to attain a specified cut.

Figure 3:
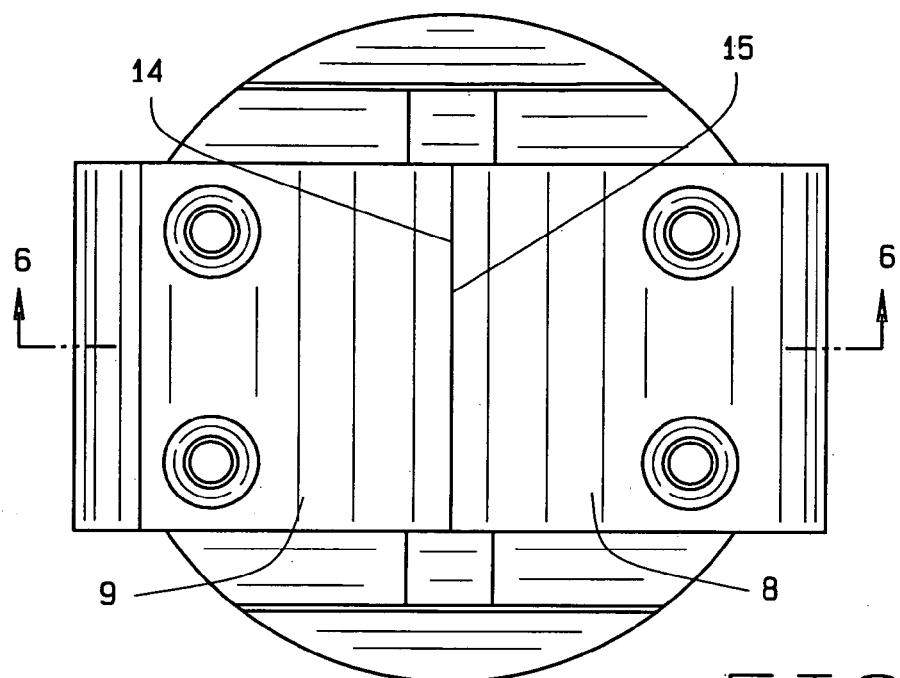
FIG. 3 is a top view of the tool as the cutting blades and its jaws are closed, as during a cutting operation.
Figure 4:
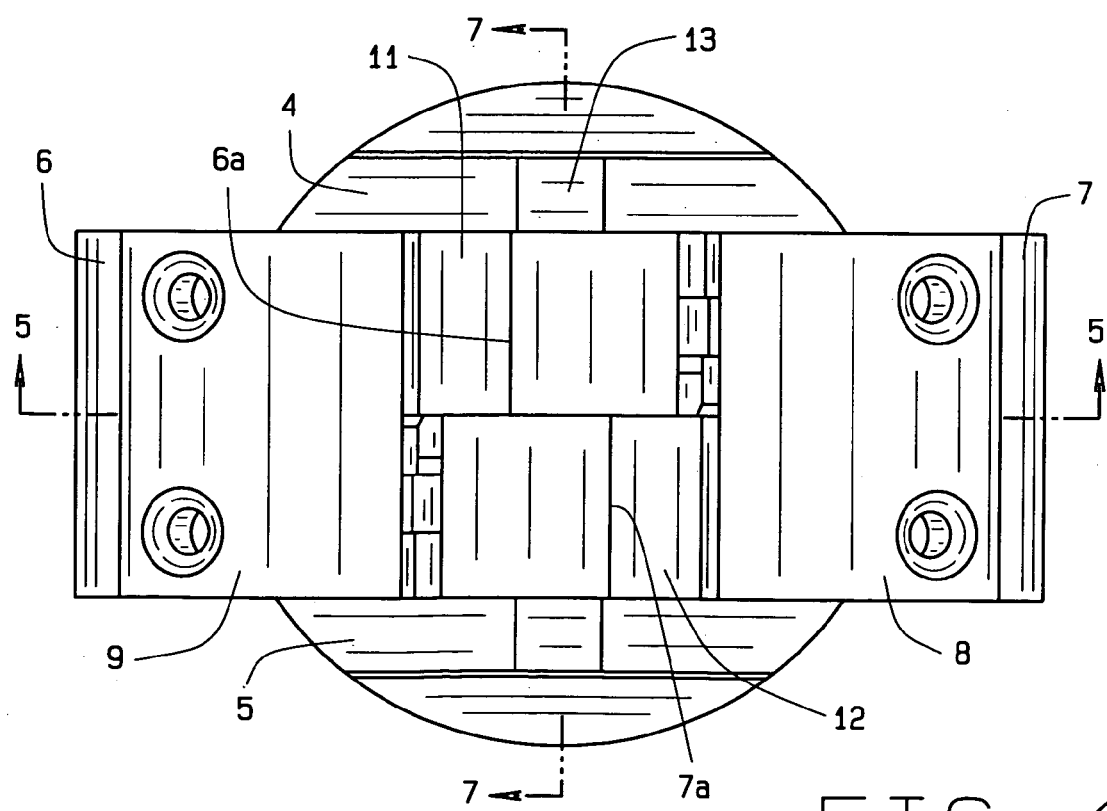
FIG. 4 is a top view of the jaws opened, after performance of a cutting operation.

As can be seen in FIGS. 3 and 4, in FIG. 3, the cutting blades 8 and 9 are shown in their cutting position, while in FIG. 4, the cutting blades 8 and 9 are in their opened, non-cutting condition or orientation, as when the tool is not in use or in between cutting actions. As can also be seen in FIG. 4, the jaws 6 and 7 holding the cutting blades, have inwardly extending integral bosses 11 and 12, respectively, and these bosses are pinned by means of the pin 13 to the associated mounts 4 and 5 as previously reviewed. Hence, the pin 13 holds the jaws, and their attached or mounted cutting blades, pivotally to the handle, or the upper end of its housing 3, so that when the jaws pivot about the pivot pin 13, they force the cutting blades 8 and 9 into closure. Releasing the hydraulic pressure allows the spring (FIG. 5 at 32) to press the piston back into the handle position, causing the jaws to pivot outwardly, and spread the opening between the cutting blades. When the jaws are pivoted into closure, the cutting blades undertake the cutting condition, as shown in FIG. 3, or each blades' cutting edge 14 and 15 are forced into contiguity and in a condition so that the desired cut may be achieved.

Figure 5:
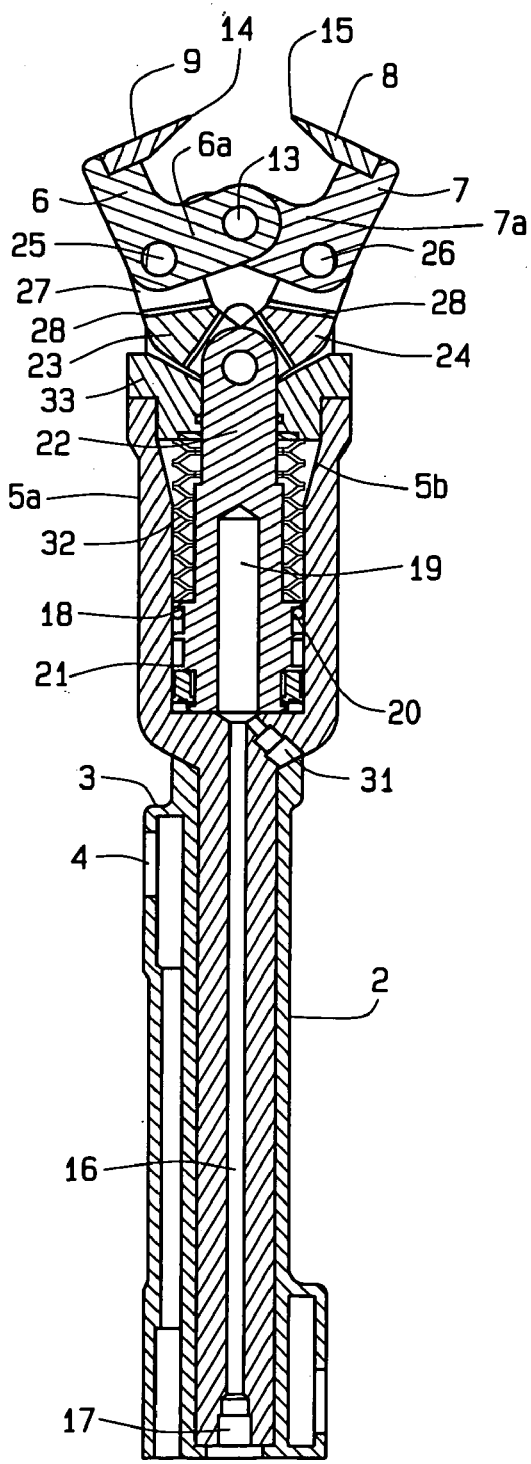
FIG. 5 is a cross sectional view along the length of the tool, showing the inner operative components, holding the jaws in an opened condition.

The internal operative components of the cutting tool of this invention can be noted in FIG. 5. As seen, the handle 2 has a central channel 16 provided there through. At the lower end of the handle is a fitting 17, that allows a hydraulic hose to be connected therewith, for delivery of hydraulic fluid, under high pressure, to the internal operative components of the tool.

The control box 3b can be readily seen, and its operative push button 4 can be noted. These provide for the closure of contacts, that electrically initiate the operations of the hydraulic pump, and any hydraulic booster, in order to attain the high pressure for the fluid, within the range of 3,000 psi to 6,000, more or less, that is needed for providing for the operations of this tool, when used.

The central channel 16 extends up towards the piston 18, embodied within the housing 3 of the tool, and the piston has a short and aligned cavity 19 provided therein. The piston has an annular flange 20 provided integrally around its perimeter, and the flange is provided for seating an o-ring 21 that furnishes a hydraulic seal within the inner surface of the housing 3, as can be noted.

Structurally, the piston has an upwardly extending integral rod like portion 22, that pivotally connects with links 23 and 24, which pivotally connect by means of pivot pins 25 and 26, respectively, to the outer edges of the jaws 6 and 7, as previously described. As can be seen, in cross section, the jaws are rather L-shaped with the base 6a of one jaw laterally overlaying the base 7a of the other jaw as can be noted in FIGS. 4 and 5. The links form part of the clevis 27 that bifurcates, and connects to the pivot pins 25 and 26, such that when the piston 22 shifts upwardly, its links and clevis pivot upon the pins 25 and 26, and force these outer segments of the jaws 6 and 7 to pivot upwardly, relative to the stationary and pivotal positioning of the central pivot pin 13, such that the jaws force their cutter blades 8 and 9 inwardly, into a miffing action. Shims may be provided in the region between the links 23 and 24, and the bottom of the jaws, such that the shims 28 may regulate the degree of force urged upon the jaws 6 and 7, and which can adjust the spacing between the cutting edges 14 and 15, of such blades.

Figure 6:
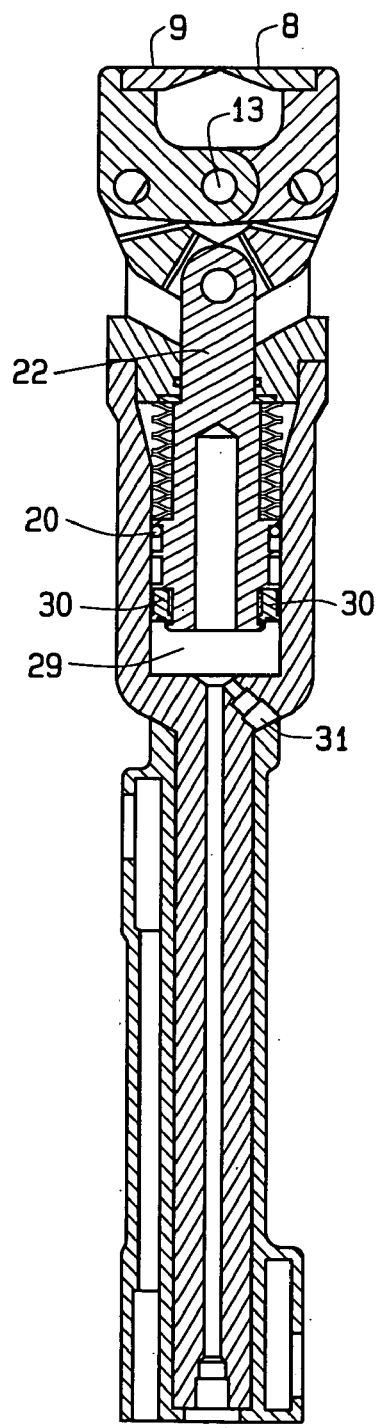
FIG. 6 is a longitudinal cross sectional view of the tool, showing the operative components holding the jaws in their closed or cutting position.

As can be seen in FIG. 6, where the piston 22 has been urged upwardly, by the accumulation and deposit of high pressure hydraulic fluid within the spacing 29, the upward portion of the piston forces the links and clevis to bias the jaws upwardly and inwardly, about their pivot pin 13, as can be readily determined. This forces the cutter blades 8 and 9 into a cutting proximity. There will be a supply of hydraulic fluid maintained within the piston chamber 29, that forces the piston upwardly, but the fluid is prevented from bypassing the piston, by means of its o-ring 21, as previously explained, and the packing 30 as noted. But, when the tool is manipulated to provide for an exhausting of its high pressure hydraulic fluid, as through an exhaust port 31, the spring 32 which biases against the upper seal 33 of the housing, and against the annular flange 20 of the piston, forces the piston rod 22 downwardly, thereby pivoting the various components of the jaws, 6 and 7, into the opened condition, as can be noted in FIG. 5. There may be another fluid line that connects with the hydraulic exhaust port 31, for channeling the hydraulic fluid back to its supply reservoir during and between each cycle of closing and opening of the jaws of the tool.

Figure 7:
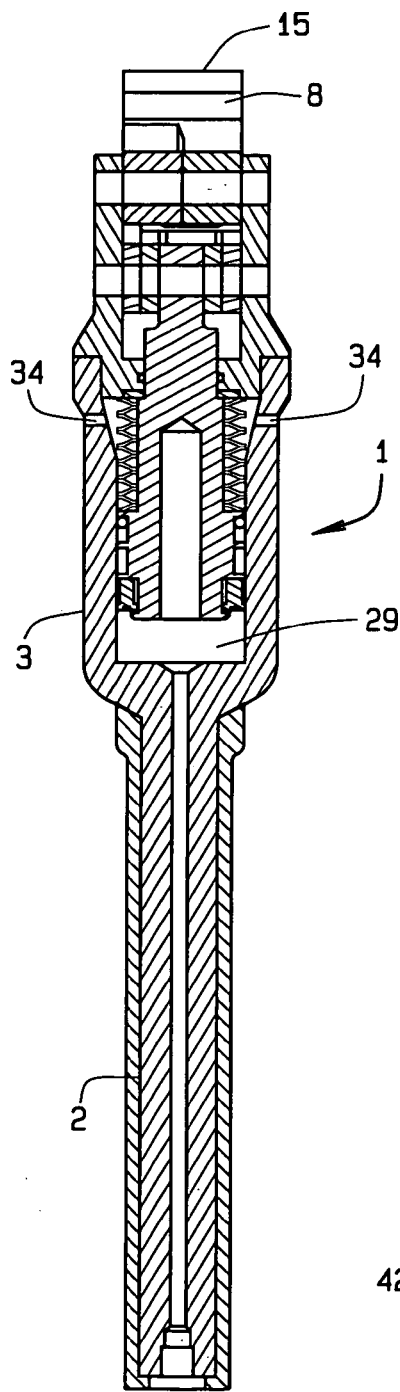
FIG. 7 is a sectional view, longitudinally, of the tool, showing one of the cutting blades in its opened condition.

FIG. 7 discloses the cutting tool 1, in a cross sectional view that is arranged approximately 90° with respect to the views furnished in FIGS. 5 and 6, and similar type components can be noted. There is provided an optional oil port 34 through either side of the housing 3, wherein lubricating fluid may be applied, in order to keep the internal components of the device lubricated, so as to assure that the piston can glide upon the inner surface of the housing cavity. Alternatively, a more viscous lubricant may be desirable, and so each of the oil ports can be fitted with a grease fitting or grease port or nipple so that grease may be applied to the chamber for the purpose of lubricating the internal components of the device. Also the upper inner end of the housing 5a may be internally beveled as at 5b to facilitate the insulation of the various o-rings and providing herein.

EXAMPLES

Example 1

This example illustrates the utility of the cutting device of the present invention in the cutting and/or trimming of various animal feet and/or hooves:

The device is used by a farrier to cut or to trim as desired the dense keratinaceous feet of animals (the hoof or nail of an animal such as at a zoo.) such as the hoof or nail of an animal selected from the group consisting of a horse, a goat, a giraffe, a buffalo, a cow, a pig, a camel, any ruminant, an elephant, a rhinoceros, a dog, a cat, and in particular a large cats such as a tiger, a lion, and the like, various bear species, the beak of a fowl such as a chicken, a turkey and the like. Each of these trimming applications are completed in substantially less time with the tool of the present invention as compared to the same activity using typical farrier tools used in the art, the trimming applications are completed in a less risky manner, with less likelihood of bodily injury to the operator of the device, with less stress upon the animal being trimmed and less physical stress upon the farrier.

Example 2

This Example illustrates the trimming of the branches or limbs of a tree or shrub.

The device of the present invention is attached by the handle to an extension bar, or a length of pipe or fiberglass rod, and an operative switch is conveniently located alone the length of the pipe, bar or rod so that the attached device can be either remotely actuated to engage the cutting blades, or can be actually engaged by depressing from a distance the button the device that actuates the jaws to close, causing the blades attached to each jaw to come together in cutting alignment. The size of the tool or the size and width of the blades are adjusted along with the jaws to be customized to the size of limbs to be cut with the device. The operator reaches the device attached to the end of the bar, rod, or pipe up into the air and positions a tree or bush branch or limb between the jaws and blades, and actuates the device, causing the branch or limb to be severed from the tree.

Example 3

This Example illustrates the cutting of extremely dense materials such as tile, ceramic, sheet metal, cable, wire, robe of different fabrics such as cotton, hemp, and nylon, chain links, metal bars and/or pipes, and leather, burlap, or canvas fabrics.

The size of the tool or the size and width of the blades are adjusted along with the jaws to be customized to the size and type of material to be cut with the device. The operator selects the type of material to be cut and inserts the material into the device and actuates the device to cut the material.

Example 4

This Example illustrates the use of the device as a crimping tool.

The cutting blades of the device are replaced with blades that are designed to come together generally along an edge, which for cutting applications, would be referred to as a cutting edge, but in this case, the edges are smooth or flat and not sharpened but instead are designed for gripping and crushing applications. The ends of two juxtapositioned wires are inserted in a parallel fashion with respect to each other into a hollow stainless steel metal bar designed to function, when crimped, as a means for holding the two wires in a fixed position with respect to each other and to grip the two wires so that they do not slip in either direction along the parallel length of each wire. The hollow bar is inserted at an angle of from about 45 degrees to about 90 degrees with reference to the position that would otherwise be a cutting edge of the blades, and the device is actuated, bringing the jaws into the cutting position, and the blades grip the hollow bar and crush the hollow bar, resulting in the crimping of the wires inserted in the hollow bar. The hollow space in the hollow metal bar is now only filled with the two parallel and inserted wires, which are held into a fixed position with respect to their parallel axis.

Example 5

This Example illustrates the use of the device of the present invention in robotic arm applications.

The device can be fitted into the mechanical means of virtually any robotic application and activated through the computer programs that operate the robotic devices, providing a means for the robotics to use to cut dense materials of almost any type accessible to robotics.

Example 6

This Example illustrates the incorporation of additional embodiments into the device of the present invention resulting in a device that is substantially safer to use than devices in the prior art.

This example describes an additional embodiment that can be incorporated into the device of the present invention. Particularly, the device is capable of severing or tearing the flesh of a human or animal body and could therefore be considered an implement that is inherently dangerous. The risk of bodily injury can be avoided by incorporating a safety switch into the device so that contact with the device jaws by flesh or moisture laden parts of the human body or an animal body triggers the safety switch that results in the jaws moving promptly and immediately into the open position until the device is manually actuated by the operator. The device can be set to override this safety device, preferably only using a computer memory based system that can also be incorporated into the device that stores one or more passwords that can be accessed by the operator, that can be set or established using an onboard toggle device that allows the operator to input a series of numeric or alphanumeric digits in the form of a password. Even manual actuation by the device operator will be prevented if fleshy tissue is continually encountered, resulting in a safer mode of operation of the cutting device. The safety switch functions typically by recognizing the increased capacity for flowing electrons of the fleshy or moisture laden object that is in contact with the jaws of the device, and activates a safety cutoff switch that terminates the closing of the jaws, or if the jaws are in the open position, terminates the ability of the operator to actuate the cutting device until the jaws and the path between the jaws are devoid of the object causing the increased capacitance.

A number of switches are known in the art and the skilled artisan will readily recognize the importance of such devices in the safest mode of operation of the present invention. For example, touch switches can be incorporated into the device, and the sensitivity of such touch switches to interruption of the cutting device upon the coming in contact of fleshy body part with the jaws of the device can be set by adjusting a resistance and capacitance pair to give delays from a few nano or micro seconds to greater periods of time after sensing the presence of such fleshy body parts. Such safety, or capacitance proximity switches, can also be adjusted to detect moisture in materials, such as moisture less than from about 50% to about 1%, or from about 40% to about 1%, or from about 30% to about 1%, or less than from about 20% total water content. For example, finger nails, claws of cats and dogs, hooves of horses, goats, pigs, and hooves of ruminants such as cattle, deer, and the like, exhibit a moisture content generally less than about 25% water, and generally may exhibit a moisture content of between about 2% to 50% depending upon ambient and climatic conditions. Therefore, a proximity switch that provided the necessary features for recognizing the presence of moisture greater than the amount of moisture present in such dense tissues would be ideally suited for the particular safety purpose contemplated in this example.

Such switches could be positioned remote from the cutting device but linked by low voltage electrical wires to the jaws of the cutting device. Alternatively, the device could be wired to sense the presence of increased moisture, and upon sensing such increase in moisture, send a signal to a remotely positioned device that signaled the cutting device to "lock out" the cutting position, preventing the operator from causing harm to the soft tissues of the targeted animal, or to the operator or any other person that may be assisting the operator in the cutting operation.

Such switches could be positioned on the outside of the cutting device either by clipping onto the device, by being soldered to the device, or by being incorporated into the frame or shell of the device. Alternatively, such switches could be positioned within the cutting device and concealed from view of the operator.

Many types of safety switches are known in the art and different properties of the soft tissues of the human body or an animal body have been used to activate such touch sensitive switches. For example, the human body is generally warmer than the surrounding air. A touch sensitive switch may be used that is sensitive to the warmth of the fleshy parts of a human or animal body, such as a finger, to activate the safety switch for use in the present invention. Also, the fleshy parts of the human body, or of an animal body, are made mostly of water, and so the fleshy parts of such bodies conduct electricity fairly well. By placing two contact very close together, the fleshy parts of a body can open the circuit when touched, and so activate the safety switch for use in the present invention. The safety device incorporated into the cutting device can therefore consist of a moisture sensor, device for detecting density through use of sound waves (a sonic means for detecting density), and a device for detecting electromagnetic variations in materials to which the cutting device is applies (for example, using visible light or other electromagnetic solutions (optical approaches, laser technology for example) for providing safer cutting applications). Other forms of control are known in the art, and the skilled artisan will recognize the variety that can be useful with the cutting device of the present invention.

Figure 8:
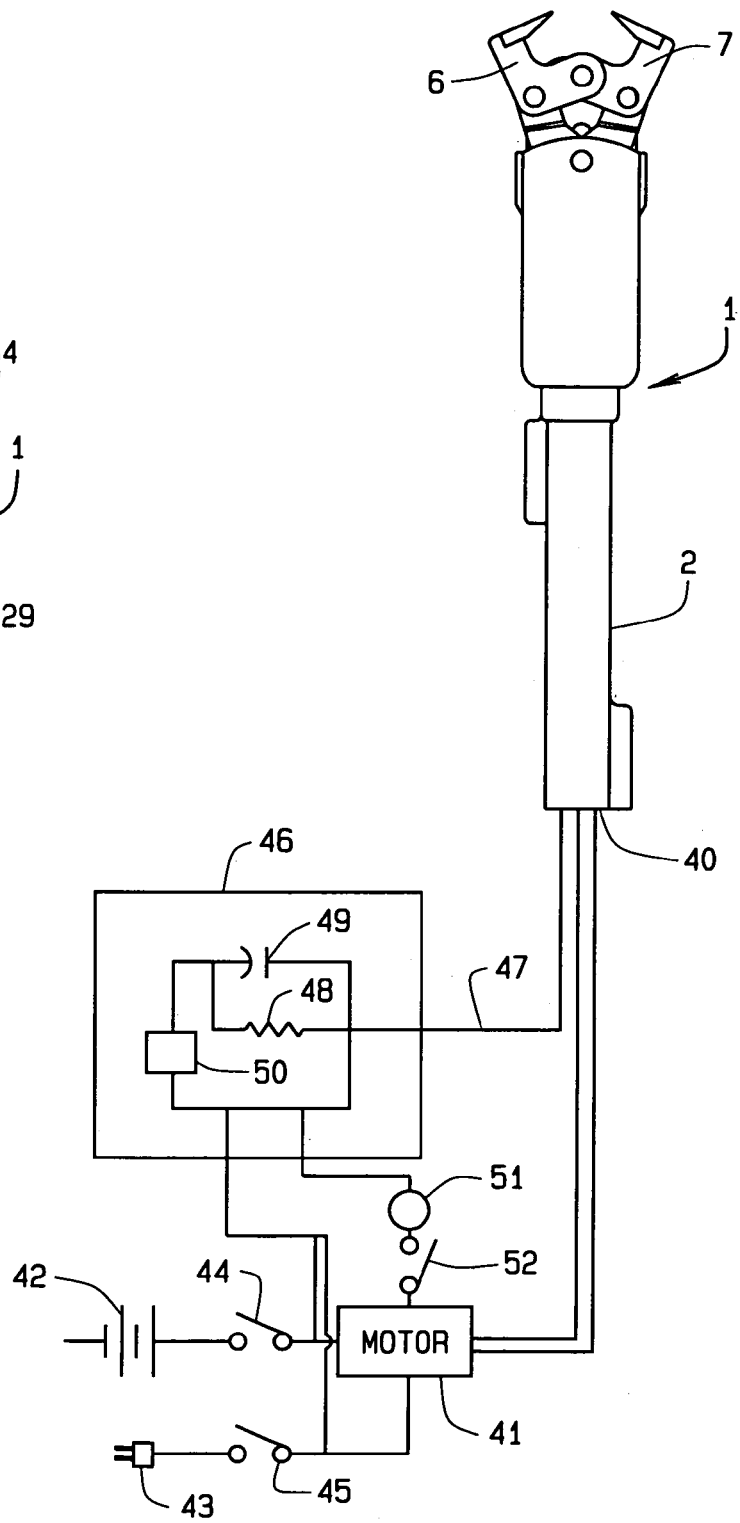
FIG. 8 provides a schematic circuit diagram showing electrical operations of the cutting tool during usage, and circuitry that can be used to detect when the hand of the user or any other is in close proximity to the cutting jaws, and therefore, the tool should be deactivated.

As can be seen in FIG. 8, the tool 1, at its lower end 40, has a series of hydraulic line(s) and circuit lines that extend into the handle 2 of the said cutting tool. Further enclosed is the hydraulic motor 41 which when actuated applies the pressurized hydraulic fluid into the piston chamber 29 to attain a cutting action of said tool. The hydraulic motor may be actuated either from a battery, as at 42 or it can plug into a wall socket, as at 43, to provide either direct current or alternate current for operations of the hydraulic motor. Manual switch means 44 and 45 are provided within their circuit lines, for the energization, or deactivating of the motor, during or after usage.

A circuit board 46 may be provided, and it is designed to function in combination with any one of the types of safety mechanisms as previously described in this application. For example, a low voltage circuit line 47 extends up through the handle, and is in electrical contact with the two jaws 6 and 7 of the cutting tool. The circuit line 47 connects either with the resistance 48 or the capacitance 49 which are in communication with the microprocessor 50 and can determine when, for example, the hand of the user is in contact with the charged jaws 6 or 7, and therefore, causes a discharge of the capacitance 49, or a generation of a resistance in the resistor 48, which is detected by the micro processor, and initiates a shut off of the motor, to prevent further operations of the cutting tool. For example, when the microprocessor detects that a hand is in contact with one of the jaws, it can initiate a signal to actuate the solenoid 51, which opens the switch 52, and prevents the operations of the hydraulic motor 41, from further actuation. The microprocessor 50 can detect when a level of discharge in the circuitry is such that human contact causes it, and therefore, deactivates the system, to prevent a cutting actuation of the tool, and the avoidance of any injury to its user.

Variations and modifications to the subject matter of this invention may be considered by those skilled in the art upon review of the invention as provided herein. Such variations, if within the spirit of this invention, are intended to be encompassed by any invention described herein. The description of the invention as set forth, and as depicted in the drawings and the examples, are set forth for illustrative purposes only.

What is claimed is:

1. A high pressure, hydraulic hand tool incorporating tool cutting jaws and cutting blades and for use in dense materials cutting applications, said hand tool having a handle, a handle chamber positioned within the handle, a housing integrated at the upper end of the handle, said housing having a piston chamber therein, wherein a piston is slidably located within the piston chamber, and is subject to a high pressure hydraulic fluid motor for urging said piston upwardly and out away from the handle chamber, during a cutting action, but is spring biased downwardly and back toward the handle chamber, for deactivating said blades of the hand tool, after a cut has been made, and wherein a series of links and clevis attached to the upper end of the piston, and are provided for urging the outer back edges of the tool cutting jaws upwardly, and inwardly, for directing the cutting blades into a severing function, and the tool cutting jaws are also pivotally mounted to the upper edge of the housing, to furnish a pivot point about which the jaws pivot, when actuated into a cutting function, said tool cutting jaws are L shaped in configuration, including upwardly extending jaw portions, and integrally laterally extending base portions, the base portions of each tool cutting jaw being pinned together through the usage of a pivot pin, while the lower ends of the upwardly extending law portions are connected by pivot pins to the respective clevis.

2. A high pressure, hydraulic hand tool incorporating tool cutting jaws and cutting blades for cutting hooves of horses, including said tool having a handle, a housing integrated at the upper end of the handle, said housing having a piston chamber therein, wherein a piston is slidably located within the piston chamber, and is subject to the high pressure hydraulic fluid for urging it upwardly, during a cutting action, but is spring bias downwardly, for deactivating the tool, after a cut has been made, links and clevis attach to the upper end of the piston, and are provided for urging the outer back edges of the tool cutting jaws upwardly, and inwardly, for directing said cutting blades into a severing function, and the tool cutting jaws are also pivotally mounted to the upper edge of the housing, to furnish a pivot point about which the said cutting jaws pivot, when actuated into a cutting function, said tool cutting jaws are L shaped in configuration, including upwardly extending jaw portions, with integrally laterally extending base portions, the base portions of each tool cutting law being pinned together through the usage of a pivot pin, while the lower ends of the upwardly extending jaw portions are connected by pivot pins to the respective clevis.

3. A method for cutting a dense material comprising providing a high pressure hydraulic hand tool as set forth in either of claim 1 or 2, and applying said tool to said dense material to achieve a cutting effect, wherein said dense material is selected from the group consisting of keratinaceous animal tissue, bone, wire, metal, and a plant tissue.

4. The high pressure hydraulic hand tool as set forth in either of claim 1 or 2, further comprising a safety device for preventing injury to an operator or to an animal to which such device is applied.

5. The high pressure hydraulic hand tool as set forth in claim 4, wherein said safety device is selected from the group consisting of a moisture sensor, sonic means for detecting density, and optical means for detecting electromagnetic variations in materials to which said tool is applied.

6. The high pressure hydraulic hand tool of claim 4 wherein said safety device includes one of a capacitance and a resistance, in contact with the tool jaws of the hand tool which in combination with a microprocessor, can detect the presence of a human touching said jaws to cause a deactivation of the hydraulic motor and prevent further activation of said hand tool.

7. The high pressure hydraulic hand tool of claim 1 wherein said housing includes said piston chamber therein, the upper edge of said piston chamber be beveled, to facilitate the application of the piston therein during assembly.

8. The high pressure hydraulic hand tool of claim 7 wherein said piston includes at least one o-ring to seal the piston within the piston chamber, and to prevent the passage of high pressure hydraulic fluid there past during actuation of the said tool.

9. The high pressure hydraulic hand tool of claim 8 further including at least one oil port provided in the upper region of the housing, for the injection of lubricating fluid therein during usage of the hand tool.

10. The high pressure hydraulic hand tool of claim 1 wherein said handle includes insulation means provided along its exterior length, to insulate a user's hand from the tool during application and prevent the activation of a safety device during usage of said tool.

11. The high pressure hydraulic hand tool of claim 1 further including both circuit lines and hydraulic lines connected between a circuit board and the hydraulic motor, respectively, into the handle of the hydraulic hand tool, to provide for the necessary charge for operations of a safety device, and to provide high pressure hydraulic fluid into the piston chamber during actuation of the hand tool during usage.

* * * * *

UNITED STATES PATENT AND TRADEMARK OFFICE
CERTIFICATE OF CORRECTION

| | | |
|---|---|---|
| PATENT NO. | : 8,176,636 B2 | Page 1 of 1 |
| APPLICATION NO. | : 12/381786 | |
| DATED | : May 15, 2012 | |
| INVENTOR(S) | : William L. Bush | |

It is certified that error appears in the above-identified patent and that said Letters Patent is hereby corrected as shown below:

Title Page,

Above Item (51) insert

--Cross Reference to Related Application

This non-provisional patent application claims priority to the provisional patent application having Serial No. 61/072,332, filed on March 28, 2008.--

Signed and Sealed this
Fourth Day of September, 2012

David J. Kappos
*Director of the United States Patent and Trademark Office*